(12) United States Patent
Medintz et al.

(10) Patent No.: US 8,226,015 B2
(45) Date of Patent: Jul. 24, 2012

(54) ORTHOGONAL CHARGE-BASED SPECTRAL CODING WITH QUANTUM DOT CONJUGATES

(75) Inventors: Igor L. Medintz, Springfield, VA (US); Dorothy Farrell, Alexandria, VA (US); Hedi M. Mattoussi, Tallahassee, FL (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/907,200

(22) Filed: Oct. 19, 2010

(65) Prior Publication Data

US 2011/0089241 A1      Apr. 21, 2011

Related U.S. Application Data

(60) Provisional application No. 61/253,168, filed on Oct. 20, 2009.

(51) Int. Cl.
*G06K 19/06* (2006.01)

(52) U.S. Cl. ............. 235/494; 235/462.04; 235/462.01; 235/454

(58) Field of Classification Search ............. 235/462.04, 235/462.01, 454, 494
See application file for complete search history.

(56) References Cited

U.S. PATENT DOCUMENTS

2008/0087843 A1    4/2008   Medintz et al.
2009/0045360 A1 *  2/2009   Wosnick et al. .............. 250/586

OTHER PUBLICATIONS

Medintz et al., Anal. Chem. 2009, 81, 4831-4839.
Medintz et al., J. Am. Chem. Soc. 2008, 130, 16745-16756.
Medintz et al., Nature Mater. Sep. 2003;2(9):630-8.
Sandros et al., J. Am. Chem. Soc. 2005, 127, 12198-12199.

* cited by examiner

*Primary Examiner* — Kristy A Haupt
(74) *Attorney, Agent, or Firm* — Amy Ressing; Roy Roberts (57) ABSTRACT

Populations of quantum dots are combined with quantities of a modulator of photoluminescence to produce a plurality of optical barcodes having at least two distinguishable colors arising from varying quantities of a modulator of photoluminescence bound to the populations of quantum dots.

18 Claims, 8 Drawing Sheets

SEQUENCE LISTING

```
<160> NUMBER OF SEQ ID NOS: 1

<210> SEQ ID NO 1
<211> LENGTH: 17
<212> TYPE: PRT
<213> ORGANISM: Artificial Sequence
<220> FEATURE:
<223> OTHER INFORMATION: Synthetic construct
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (9)..(9)
<223> OTHER INFORMATION: Aib

<400> SEQUENCE: 1

His His His His His His Gly Leu Xaa Ala Ala Gly Gly His Tyr Gly
1               5                   10                  15

Cys
```

ORTHOGONAL CHARGE-BASED SPECTRAL CODING WITH QUANTUM DOT CONJUGATES

CROSS-REFERENCE TO RELATED APPLICATIONS

This application claims the benefit of U.S. Provisional Application 61/253,168 filed on Oct. 20, 2009, the entirety of which is incorporated herein by reference.

BACKGROUND

The introduction of luminescent semiconductor nanocrystals or quantum dots (QDs) to biology has provided researchers with novel fluorescent tools for potentially achieving advances in imaging, sensing, and for developing optical barcodes. See, for example, U.S. Patent Application Publication No. 2008/0087843, which is incorporated herein by reference. This arises from the unique photophysical properties that these fluorophores provide including: size-tunable narrow, symmetrical photoluminescence (PL, full-width at half-maximum ~25-40 nm) and broad absorption spectra that increase towards shorter wavelengths. Using different semiconductor combinations it is possible to prepare nanocrystals with emissions ranging from the UV to well into the near infrared region of the optical spectrum. QDs also exhibit high quantum yields, a pronounced resistance to chemical degradation, and high photo-bleaching thresholds. A particularly useful property is that multiple QDs present in the same sample can be efficiently excited at a single wavelength far removed (>100 nm) from their respective emissions. This makes QDs directly amenable to signal multiplexing, i.e., the simultaneous detection of multiple concurrent fluorescent emissions or channels.

Simultaneous detection of multiple independent fluorescent signals or signal multiplexing has the potential to significantly improve bioassay throughput and to allow visualization of concurrent cellular events. Applications based on signal multiplexing, however, have been previously been difficult to achieve in practice due to challenges in both implementing hardware and the photophysical liabilities associated with available organic dye and protein fluorophores.

BRIEF SUMMARY

In one embodiment, populations of quantum dots are combined with quantities of a modulator of photoluminescence to produce a plurality of optical barcodes having at least two distinguishable colors arising from varying quantities of a modulator of photoluminescence bound to the populations of quantum dots.

In another embodiment, optical barcodes comprise a plurality of optical barcodes of having at least two distinguishable colors, wherein each optical barcode comprises a plurality of populations of quantum dots, and wherein the distinguishable colors arise from varying, between the barcodes, quantities of a modulator of photoluminescence bound to the populations of quantum dots.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 shows schematics of the charge-transfer based multiplexing. FIG. 1C shows a simulated structure of a QD self-assembled with one Ru-phen-peptide. The QD is approximated by a sphere of ~58 Å core-shell diameter ($\lambda_{em}$ ~555 nm). The hexahistidine portion of the peptide is labeled in green, the center section beginning from the first glycine to the third glycine is in yellow, the portion from the next histidine to the cysteine is in white, and the Ru-phen complex is in red. Center-to-center distance of ~53 Å is marked with a dashed line and estimated using Förster resonance energy transfer (FRET) with dye-labeled versions of this peptide.

FIG. 3A shows composite spectra for different mixing configurations wherein various QDs in the sample were quenched by conjugation. FIGS. 3B to 3F show measured composite, deconvoluted individual QD spectra and a fit of the summed components for the various configurations from FIG. 3A.

FIG. 4A shows evolution of composite spectra collected from different mixing conditions: none conjugated to peptide-Ru-phen; 510 nm QDs; 510 and 537 nm QDs; 510, 537, 555 nm QDs; 510, 537, 555, 565 nm QDs; 510, 537, 555, 565, 581 nm QDs; and all conjugated to Ru-phen-peptide. FIGS. 4BB and 4C (which have different intensity scales) show measured composite, deconvoluted individual QD spectra and a fit of the summed components for: none and all conjugated to Ru-phen-peptide ("all quenched").

FIG. 5A shows evolution of composite spectra collected from different mixing conditions: none; 510 nm QDs; 510 and 537 nm QDs; 510, 537, 555 nm QDs; 510, 537, 555 and 565 nm QDs; 510, 537, 555 565 and 581 nm QDs; 510, 537, 555 565, 581 and 610 nm QDs; and all conjugated to Ru-phen-peptide. Measured composite, deconvoluted individual QD spectra and a fit of the summed components for: none (FIG. 5B); 510 and 537 nm QDs quenched (FIG. 5C); 510 through 565 nm QDs quenched (FIG. 5D); 510 through 590 nm QDs quenched (FIG. 5E); and all quenched (FIG. 5F).

FIG. 6 shows an evaluation of solution-phase quenching. The PL of 590 nm QDs was monitored in the presence of 510 nm QDs pre-assembled with an increasing molar ratio of Ru-labeled peptide. For the highest value of 1, the molar amount of Ru-phen-peptide added to the 510 nm QDs is equivalent to the total concentration used in the eight-plex sample (see FIG. 5). Fractions indicate incremental amounts of total Ru-phen-peptide added to the 510 nm QDs.

DETAILED DESCRIPTION

Definitions

The term "quantum dot" or "QD" used herein refers to an inorganic crystallite of about 1 nm or more and about 1000 nm or less in diameter or any integer or fraction of an integer therebetween, preferably at least about 2 nm and about 50 nm or less in diameter or any integer or fraction of an integer therebetween, more preferably at least about 2 nm and about 20 nm or less in diameter (for example about 2, 3, 4, 5, 6, 7, 8, 9, 10, 11, 12, 13, 14, 15, 16, 17, 18, 19, or 20 nm). QDs are characterized by their uniform nanometer size. A QD is capable of emitting electromagnetic radiation upon excitation (i.e., the QD is luminescent) and includes a "core" of one or more first semiconductor materials, and may be surrounded by a "shell" of a second semiconductor material. A QD core surrounded by a semiconductor shell is referred to as a "core/shell" QD. The surrounding "shell" material will preferably have a bandgap energy that is larger than the bandgap energy of the core material and may be chosen to have an atomic spacing close to that of the "core" substrate.

The core and/or the shell can be a semiconductor material including, but not limited to, those of the groups II-VI (ZnS, ZnSe, ZnTe, US, CdSe, CdTe, HgS, HgSe, HgTe, MgS, MgSe, MgTe, CaS, CaSe, CaTe, SrS, SrSe, SrTe, BaS, BaSe, BaTe, and the like) and III-V (GaN, GaP, GaAs, GaSb, InN, InP, InAs, InSb, and the like) and IV (Ge, Si, and the like) materials, PbSe, and an alloy or a mixture thereof. Preferred shell materials include ZnS.

A QD is optionally surrounded by a "coat" of an organic capping agent. The organic capping agent may be any number of materials, but has an affinity for the QD surface. In general, the capping agent can be an isolated organic molecule, a polymer (or a monomer for a polymerization reaction), an inorganic complex, or an extended crystalline structure. The coat can be used to convey solubility, e.g., the ability to disperse a coated QD homogeneously into a chosen solvent, functionality, binding properties, or the like. In addition, the coat can be used to tailor the optical properties of the QD.

Thus, the quantum dots herein include a coated core, as well as a core/shell QD.

As used herein, the term "population" with regard to quantum dots refers to a plurality of quantum dots sharing a common wavelength of maximum emission.

As used herein, the term "optical barcode" refers to a combination of two or more populations of quantum dots in close contact.

Multiplex Spectral Coding

Previously-described techniques for multiplex coding utilize variation in the concentration of the component fluorophores (organic dyes, quantum dots, etc.) to modulate the intensity of the resultant spectra. In contrast, described here is a novel and non-obvious technique for creating complex optical or spectral codes with photoluminescent quantum dots (QDs). Control of photoluminescence (PL) is attained through the attachment of redox-active labeled bioconjugates to the QD surface, without a need for varying the concentration of component QDs.

The charge-transfer interactions between ruthenium phenanthroline (Ru-phen) and CdSe—ZnS QD conjugates assembled via a peptide bridge have been investigated, as described in Medintz et al., J. Am. Chem. Soc. 2008, 130 16745-16756. The Ru-phen-labeled peptides were ratiometrically self-assembled onto the QDs and the resulting quenching was analyzed. The data showed that effective quenching of the QD photoluminescence (PL) by the proximal Ru-Phen complex can occur for several size nanocrystals emitting over a broad window of the optical spectrum. Results also showed that PL quenching efficiency directly traced the number of Ru-phen complex brought into proximity of the QD. It appears that the PL loss arises from charge transfer between the metal complex and the QD surface, and that this process is controlled by the mismatch between the oxidation levels of the metal complex and the nanocrystals. Other metal complexes such as ferrocene exhibiting higher oxidation potentials than that of the QDs did not engage in charge transfer interactions and did not induce PL quenching.

In brief, charge transfer interactions between luminescent semiconductor quantum dots (QDs) and modulators such as proximal redox complexes provide controlled modulation (enhancing or quenching) of QD photoemission in a multiplexed format. This allows for optical barcodes whereby the proportions of constituent fluorophores are kept constant, but the emissions of the fluorophores are individually modulated to create different barcodes.

As described in greater detail below, it was conceived that exploiting charge transfer as a transduction mechanism, where many distinct QD colors/sizes are efficiently quenched by the same Ru-phen complex acting as a "universal" quencher, could improve the multiplexing capabilities of QDs as compared to configurations offered by FRET. It is also possible to employ a modulator, such as a peptide or protein, to enhance PL emission, as described in, for example, Medintz et al., Nat Mater. 2003 September; 2(9):630-8 and references cited therein. Although examples described herein use ruthenium phenanthroline as a quencher, other suitable quenchers can be identified by one of ordinary skill in the art, for example using techniques described in Medintz et al., J. Am. Chem. Soc. 2008, 130, 16745-16756 mentioned above. Other potential modulators include electron donors or acceptors or those acting by other mechanisms such as FRET and electric field modification.

Materials and Methods

Appropriate techniques are further detailed in Medintz et al., Anal. Chem. 2009, 81, 4831-4839.

Figure 1A:
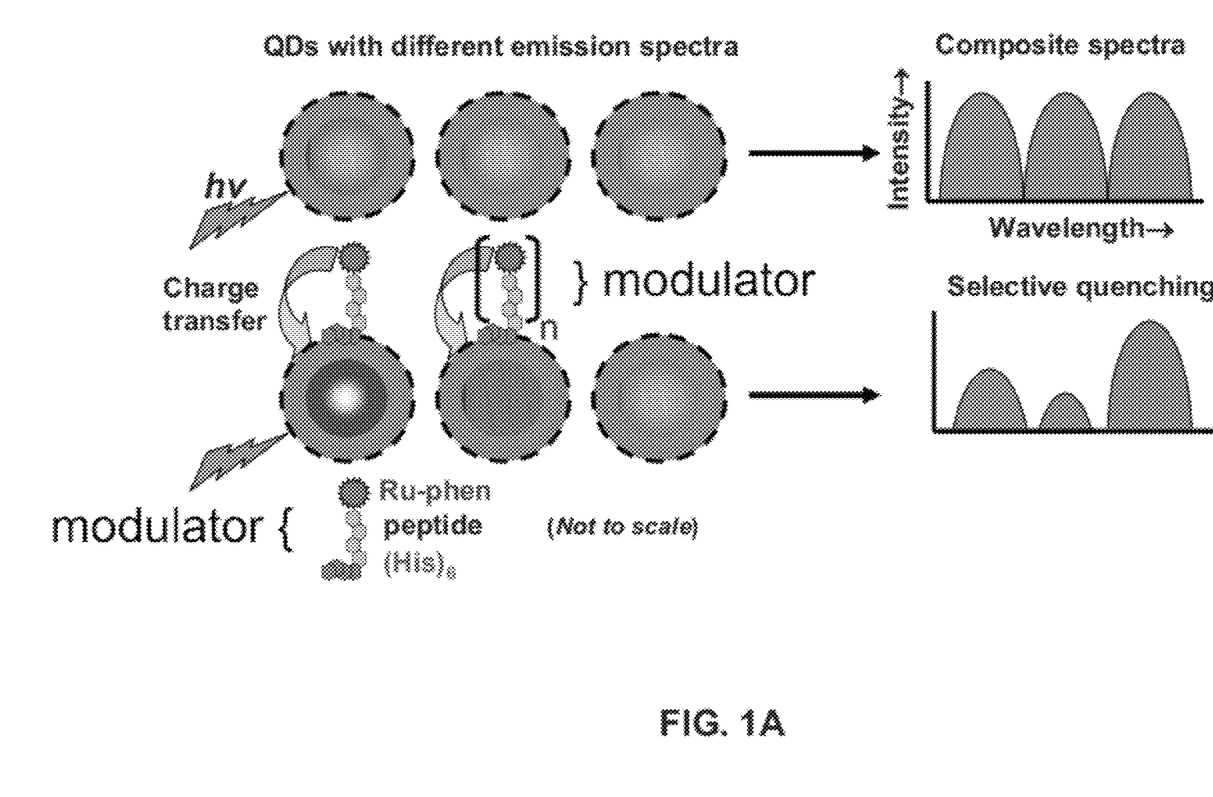
In FIG. 1A, the top shows schematic illustrations of CdSe—ZnS core-shell QDs with different emissions are mixed yielding a composite multiplex emission spectrum, while the bottom shows schematic illustration of self-assembling QD subsets with ruthenium phenanthroline (Ru-phen) complex labeled-peptide selectively quenching their PL emission (via charge transfer). Quenching of each QD color can be further tailored by varying the number of Ru-phen peptide per QD.
Figure 1B:
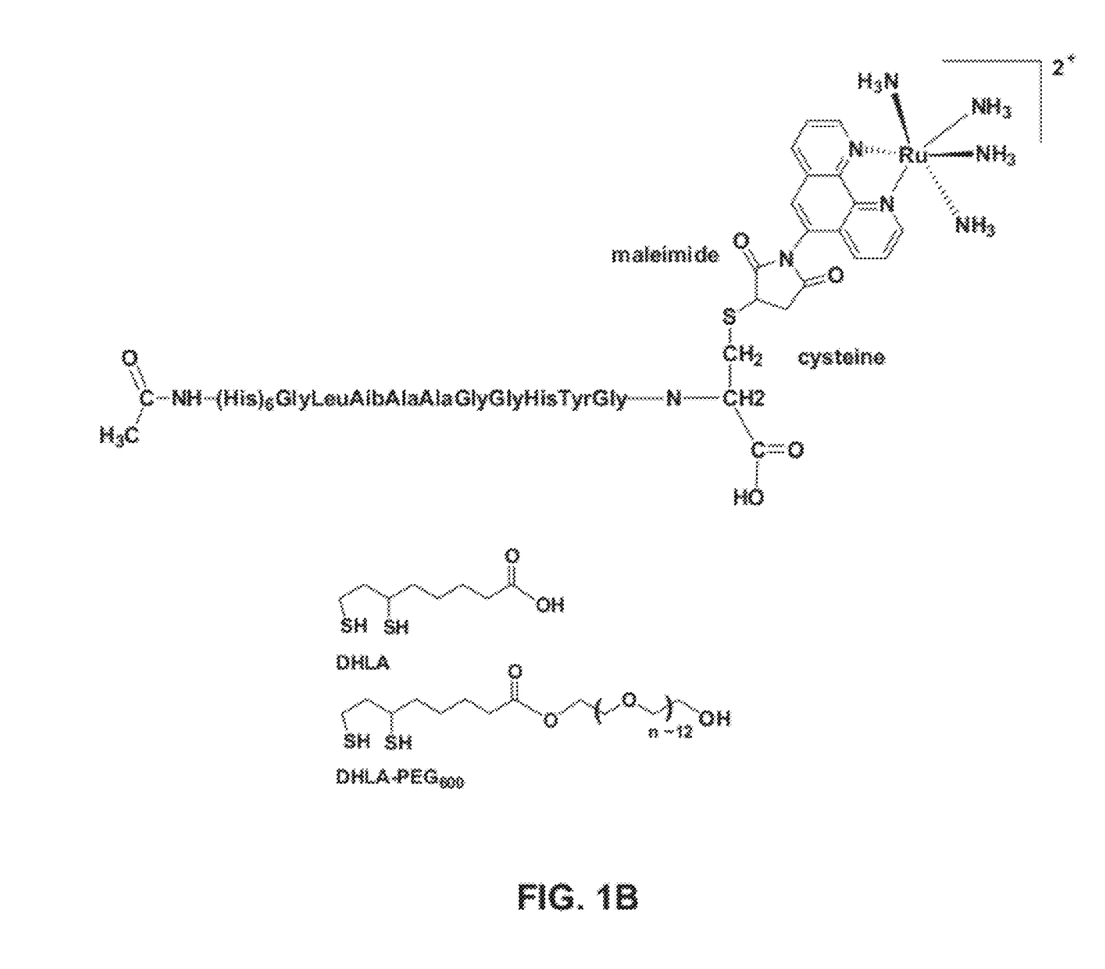
FIG. 1B shows structures of tested materials including Ru(II) polypyridyl maleimide-labeled peptide (SEQ ID NO: 1), with amino acids abbreviated by 3-letter code (apart from the labeled cysteine), and DHLA and DHLA-PEG QD-solubilizing ligands.

Quantum Dots. CdSe—ZnS core-shell QDs with emission maxima centered at 510, 537, 555, 565, 581, 590, 610 and 635 nm were used (see FIG. 2). The nanocrystals were synthesized by reacting organometallic precursors in a hot coordinating solvent mixture following the procedures described in Peng, et al., Journal of the American Chemical Society 2001, 123, 183-184 and Dabbousi, et al., J. Phys. Chem. B. 1997, 101, 9463-9475. The 635 nm-emitting nanocrystals were synthesized with a two-layer shell structure made of CdZnS—ZnS. Extinction coefficients were estimated as described in Leatherdale, et al., J. Phys. Chem. B. 2002, 106, 7619-7622 and Striolo et al., J. Phys. Chem. B. 2002, 106, 5500-5505. QDs were made hydrophilic by exchanging the native trioctyl phosphine and trioctyl phosphine oxide (TOP/TOPO) ligands with either dihydrolipoic acid (DHLA) or polyethylene glycol (PEG)-appended DHLA; PEG with $M_W$ ~600 Da was used. See Mattoussi et al., J. Am. Chem. Soc. 2000, 122, 12142-12150 and Susumu et al., J. Am. Chem. Soc. 2007, 129, 13987-13996. Schematic structures appear in FIG. 1(B). The resulting nanocrystals are referred to as DHLA-QDs and DHLA-PEG-QDs, respectively Peptide Labeling. The synthetic peptide sequence used for this study consisted of the sequence Ac-(His)$_6$GlyLeuAibAlaAlaGlyGlyHisTyrGlyCys-amide, (SEQ ID No: 1), where Ac is an acetyl group at the N-terminus and Aib is the non-coded residue alpha-amino isobutyric acid. The peptides were synthesized manually using in-situ neutralization cycles for Boc-solid phase peptide synthesis. Maleimido-functionalized tetra-amine ruthenium Ru(II)polypyridyl complex, [Ru(II)(NH$_3$)$_4$(1,10-phenanthroline-5-maleimide)](PF$_6$)$_2$ (referred to as Ru-phen, synthesized as detailed in Trammell, et al., *Bioconjugate Chemistry* 2001, 12, 643-647), was reacted with the terminal cysteine of the peptide to form the covalently labeled Ru-phen peptide-complex. Briefly, 1 mg of peptide was dissolved in 1 mL PBS (0.1 M sodium phosphate and 0.15 M NaCl pH 7.4) along with 1 mg of Ru-phen maleimide and incubated overnight at 4° C. with continuous agitation. Labeled peptide was purified over Ni-NTA resin (Qiagen, Valencia Calif.), eluted with 250 mM imidazole-PBS, dialyzed against PBS and desalted using reverse phase 18 oligonucleotide purification cartridges (Applied Biosystems Incorporated, Mountain View, Calif.). Labeled peptide concentration was determined using the Ru-phen complex absorbance at 490 nm (molar extinction coefficient 5000 M$^{-1}$cm$^{-1}$). Purified peptides were lyophilized and stored at −20° C. until used.

Conjugate Preparation and Fluorescence Data Collection. Each set of QD-Ru-phen peptide-conjugate was independently formed by adding the indicated molar ratios of Ru-phen-peptide to the QDs in 100 µL of 10 mM sodium tetraborate buffer pH 9.5 and let incubate for 1 hour. Each set of QD-Ru-phen peptide-conjugate was independently formed by adding the indicated molar ratios of Ru-phen-peptide to the QDs in 100 µL of 10 mM sodium tetraborate buffer pH 9.5 and let incubate for 1 hour. Attachment of the Ru-phen-labeled peptide to the QD surface is driven by metal-affinity interactions between the histidine tag and the metal rich QD surface. See Sapsford et al., *J. Phys. Chem. C*, 2007, 111 (31) 11528-11538. This results in a conjugate geometry where each QD of a particular emission color is simultaneously attached to an average number of Ru-phen peptides (QD-conjugate valence). Choosing the conjugate valence allows one to achieve the desired quenching level for each QD population. For multiplex experiments, these independently assembled QD-conjugates were then mixed together and simultaneously interrogated. Characterization of each set (color) of self-assembled conjugates with increasing Ru-phen-peptide:QD ratio provided a reference to which the fluorescence of that particular QD contribution in a later mixture could be compared (see FIG. 2). The final amounts of QDs used in the mixture ranged from 5 to 40 picoMoles depending on the quantum yield and the observed quenching efficiency. Individual QD-conjugates prepared with the desired quenching levels were mixed and diluted in borate buffer to a final volume of 3 mL (corresponding to a final QD concentration range of ~1.7 to 13.3 nM). Solutions were then loaded into a 3 mL quartz cuvette (1 cm optical path) and PL spectra acquired using a SPEX Fluorolog-3 Fluorimeter (Jobin Yvon/SPEX, Edison N.J.) with 350 nm excitation.

Spectral Deconvolution. Deconvolution of the composite spectra to isolate the individual contribution of each QD population is important to the described application. The PL spectra of each individual QD population (neat solution) can be fitted to a Gaussian profile. Then the composite emission spectrum from each sample mixture consisting of quenched and/or unquenched QDs (no Ru-phen peptide) can be fit using a superposition of Gaussian-like profiles of the form:

$$I(\lambda) = \sum_i I_i = \sum_i A_i e^{\frac{-(\lambda-\lambda_i)^2}{\sigma_i^2}}, \quad (1)$$

where $A_i$ is constant parameter, i designates an individual population, $I_i(\lambda)$ its emission spectrum and $A_i$ the corresponding peak amplitude. $\lambda_i$ designates the emission peak location and $\sigma_i$ accounts for its width and these were extracted from fits to the spectra of each individual QD population. This provided a reference composite spectrum for each QD sample to which the quenched QD-peptide-Ru-phen conjugates were compared. To extract a measure for the PL quenching in the sample mixture it was assumed that the Gaussian profiles of each population, $I_i(\lambda)$, was maintained (i.e., $\lambda_i$ and $\sigma_i$ stay the same and only the amplitude is reduced). The composite spectrum was then fit to an equation of the form:

$$I(\lambda) = \sum_i C_i I_i(\lambda) = \sum_i C_1 A_i e^{\frac{-(\lambda-\lambda_i)^2}{\sigma_i^2}}, \quad (2)$$

where $C_i$ is a weighting factor ($0<C_i<1$ for all cases) that provided a measure of the PL loss for that QD subset. All fits were done using IgorPro software (WaveMetrics, Portland, Oreg.). Gaussian profiles have been previously used for single population emissions, when fitting the composite spectra collected from an optical barcode made of multiple QD colors embedded in a polymeric bead

EXAMPLES

Polyhistidine-appended peptides were site-specifically labeled with a redox-active ruthenium (Ru) phenanthroline complex and self-assembled onto QDs, resulting in controlled quenching of the QD emission. Different QD colors either alone or coupled to Ru-phen-peptide were then mixed together and the resulting fluorescent signal optically interrogated. Composite spectra collected from mixtures ranging from 4 up to 8 distinct QD colors were deconvoluted and the individual QD PL loss due to charge transfer quantified. The described multiplexing modality provides a simpler format for exploiting the narrow, size-tunable QD emissions than that offered by resonance energy transfer; for the latter higher orders of multiplexing are limited by spectral overlap requirements.

Figure 1C:
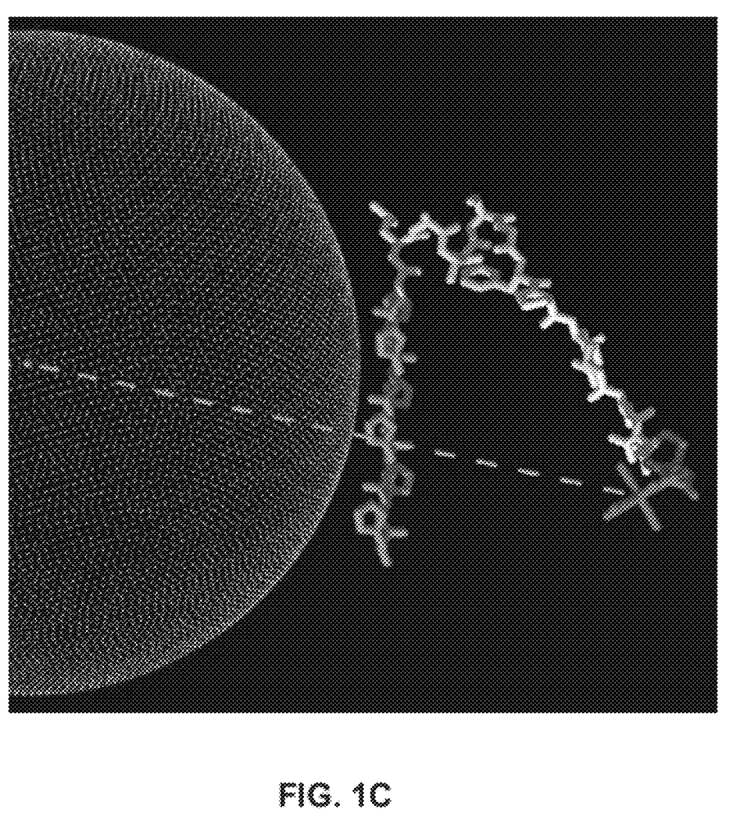

Self-assembly of quantum dot-Ruthenium phenanthroline-labeled peptide assemblies. Metal-affinity driven self-assembly facilitated the conjugation between hexa-histidine (His$_6$)-appended peptides and QD surfaces. This conjugation strategy applies to both DHLA- and DHLA-PEG-QDs, has a high-affinity with nanomolar dissociation constants and allows for control over conjugate valence. The peptide sequence used here provided a bridge between the nanocrystals and the Ru-phen complex and has key structural characteristics which facilitate its function, as can be seen in the simulated structure shown in FIG. 1C. It has a helix-linker sequence (highlighted in yellow) that provides rigidity, attached to the N-terminal His$_6$ QD-assembly sequence (green), a spacer (highlighted in white), and a terminal cysteine residue which is site-specifically coupled to the maleimide on the Ru-phen (red). For these experiments, appropriate molar ratios of Ru-phen-peptide were self-assembled onto each set of QDs to achieve the desired PL quenching efficiency prior to mixing with the other QD samples.

The charge-transfer interactions from the Ru-phen to the QDs, which effectively quench the PL of QDs emitting across a broad window of the visible spectrum, form the basis of the demonstrated multiplexing. In the following, different QD quenching sample configurations are examined: First several QD populations emitting across distinct regions of the optical spectrum were coupled to the Ru-phen-peptide and interrogated individually to show that PL quenching could be controlled through conjugate valence, thereby providing an initial set of reference data (standards). Then mixtures of the QD-Ru-phen-peptide assemblies using varying degrees of complexity and reagent concentrations were simultaneously interrogated. This allowed several multiplex charge transfer configurations to be investigated.

Figure 2:
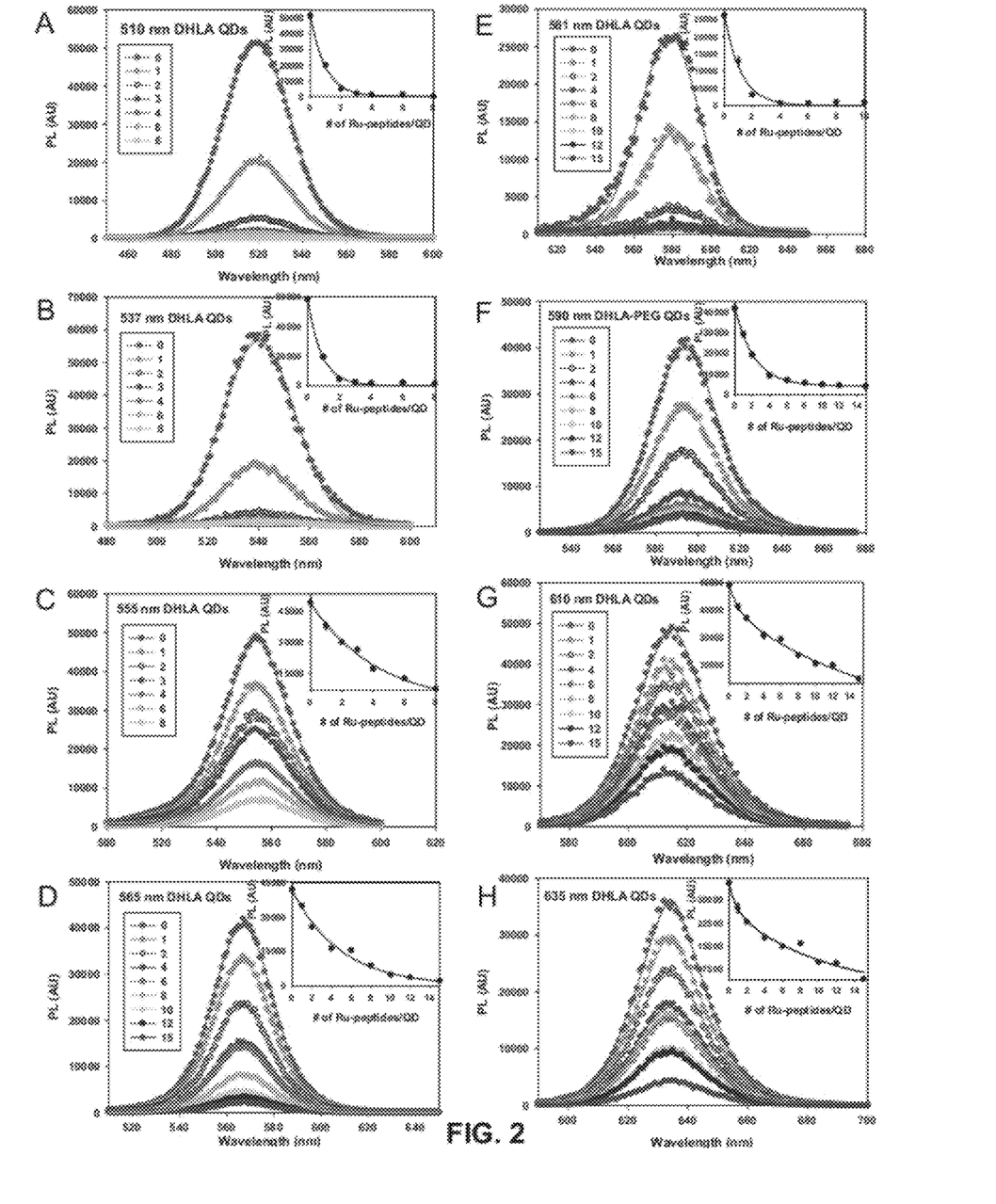
FIGS. 2A to 2H show photoluminescence (PL) of QD-Ru-phen-peptide vs. number of Ru complexes assembled per QD. PL data are shown for 510, 537, 555, 565, 581, 590, 610, and 635 nm QDs. Both DHLA- and DHLA-PEG-QDs were used. QD emissions were fit with Gaussian profiles. The inset in each shows QD wavelength of PL intensity ($\lambda_{max}$) vs. the number of Ru complexes assembled (n).

Quenching of individual QD populations: single channel interactions. FIG. 2 shows the progression of the PL spectra collected from eight distinct individual QD dispersions/colors (peak emission ranging from 510 to 635 nm) self-assembled with increasing numbers of Ru-phen-peptide per QD-conjugate. Overall, the data confirm that the Ru-phen complex can engage in effective charge transfer-induced quenching of QD emission, with a PL loss that directly depends on the conjugate valence for each set of QDs. Data also show that smaller QDs exhibit higher quenching efficiencies than their large size (red-emitting) counterparts. For example, a PL loss exceeding 50% was measured for the 510-nm QDs (core radius ~13.5 Å) at a ratio of one Ru-phen-peptide per QD-conjugate, while only ~15% PL loss was measured for the 610 nm QDs (core radius ~24 Å) at the same valence. The inserts in each panel of FIG. 2 show the trend for QD PL loss vs. number of Ru-phen complex per conjugate, n, which follows the general form:

$$\frac{PL_n}{PL_0} = 1 - \frac{n}{K+n}, \quad (3)$$

where $PL_a$ and $PL_0$ designate the fluorescence spectra measured for QD-Ru-phen conjugates and QDs alone, respectively, and K reflects the center-to-center separation distance r (assumed constant for all self assembled QD-peptide conjugates). This quenching behavior is very similar to what was recorded for FRET data collected from QD-peptide/protein-dye conjugates (QD-dye pairs). The more pronounced quenching for smaller size (bluer emitting) QDs may be attributed to a higher density of surface states and higher probability for charge transfer than that expected for their larger size counterparts. More importantly, because the PL loss for a given QD color directly depends on n, the desired level of quenching can be achieved by discretely controlling the conjugate valence.

Figure 3:
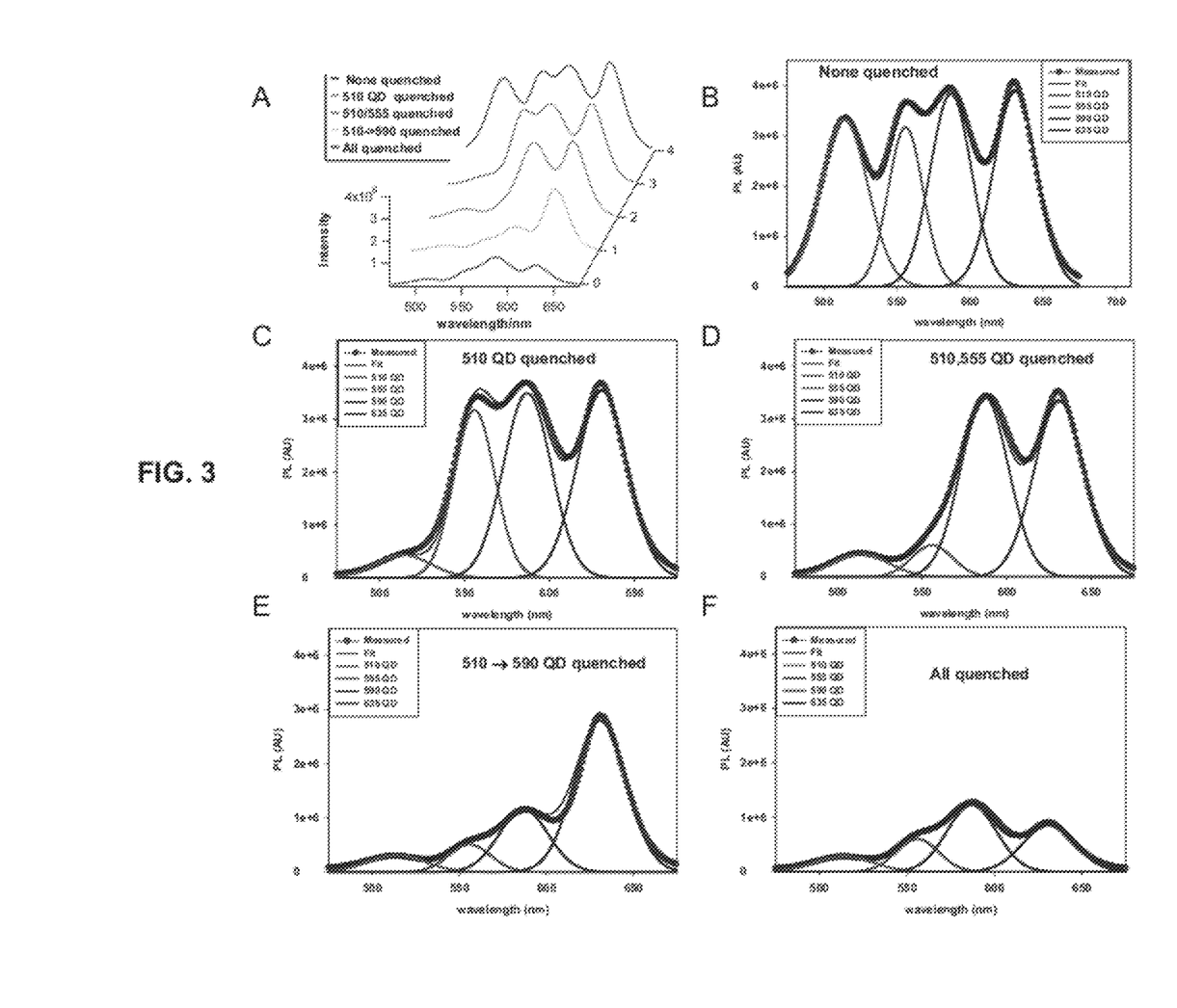
FIG. 3 shows an exemplary four-color multiplexing configuration using 510, 555, 590 and 635 nm-emitting DHLA-PEG-QDs.

Four channel interactions. An initial multiplex configuration tested employed four sets of QDs having well-resolved emissions (limited spectral overlap): 510, 555, 590 and 635 nm-emitting DHLA-PEG-QDs, seen in FIG. 3. Concentrations of the various sets of QDs in the mixture were adjusted depending on their relative PL emissions to provide comparable contributions (same order of magnitude) to the measured composite spectra. Bluer emitting dots have lower extinction coefficients than redder emitting ones, thus slightly larger reagent concentrations were needed for the smaller size nanocrystals to compensate for this difference. A series of samples with different combinations of unconjugated QDs and/or QD-Ru-phen-peptide assemblies were then prepared using the four QD colors. In these samples, the ratio of Ru-phen-to-QD used for each set was adjusted so that a sizable and easy to quantify PL loss (~50-70%) could be realized; with ratio selection guided by the data shown in FIG. 2. This provided an unambiguous evaluation of each quenching channel and this level of PL loss was maintained for subsequent configurations. FIG. 3a shows the experimental spectra collected for several combinations of QD mixtures, namely no QD set conjugated to Ru-phen-peptide, one-, two-, three- and all four color QDs conjugated to the Ru-phen complex, In the mixed samples, the emission peak of each QD set can still be identified due to the clear spectral separation for these sets. For each of these four channel configurations, the composite spectra along with the deconvoluted individual contribution of each QD population and a re-summation of the individual fits are shown in FIGS. 3b-f.

PL quenching of CdSe—ZnS QDs by proximal Ru-complex coupled via the His-appended peptide bridges was measured using nanocrystals capped with either DHLA or DHLA-PEG. Data and fits for a similar four-plex configuration using 510, 555, 590 and 635 nm-emitting DHLA-QDs derived essentially equivalent data to the above. An alternate four-plex sample configuration using a different set of QDs, namely 510, 537, 555 and 565 nm-emitting QDs, was also tested; the peak emissions of these populations are much closer than those described above and individual emission maxim were no longer visibly delineated. Deconvolution of the composite spectra to isolate individual QD contributions, however, could still be efficiently achieved.

Six and eight channel interactions. FIG. 4a shows the composite spectra collected from sample mixtures of six QD populations consisting of 510, 537, 555, 565, 581, and 590 nm-emitting QDs. In these mixtures, selected subsets were conjugated to Ru-phen-peptide and experienced PL loss. FIGS. 4b and 4c show the composite spectra, along with the deconvoluted individual PL contributions for two configurations: the 'none' and 'all' QD populations engaged in charge transfer quenching, respectively. FIG. 5a shows the composite spectra collected from an eight-color mixture (eight-plex) using 510, 537, 555, 565, 581, 590, 610 and 635 nm emitting QDs, where as above selected subsets or all populations were engaged in quenching interactions with the Ru-phen complex. FIGS. 5b through 5f show the composite spectra collected, along with the deconvoluted individual contributions from each population for samples that had zero, one, two-, four-, six- and all eight-QD colors coupled to Ru-phen, respectively. Similar data along with the spectral deconvolution were also collected from five- and seven-color QD mixtures.

Figure 4:
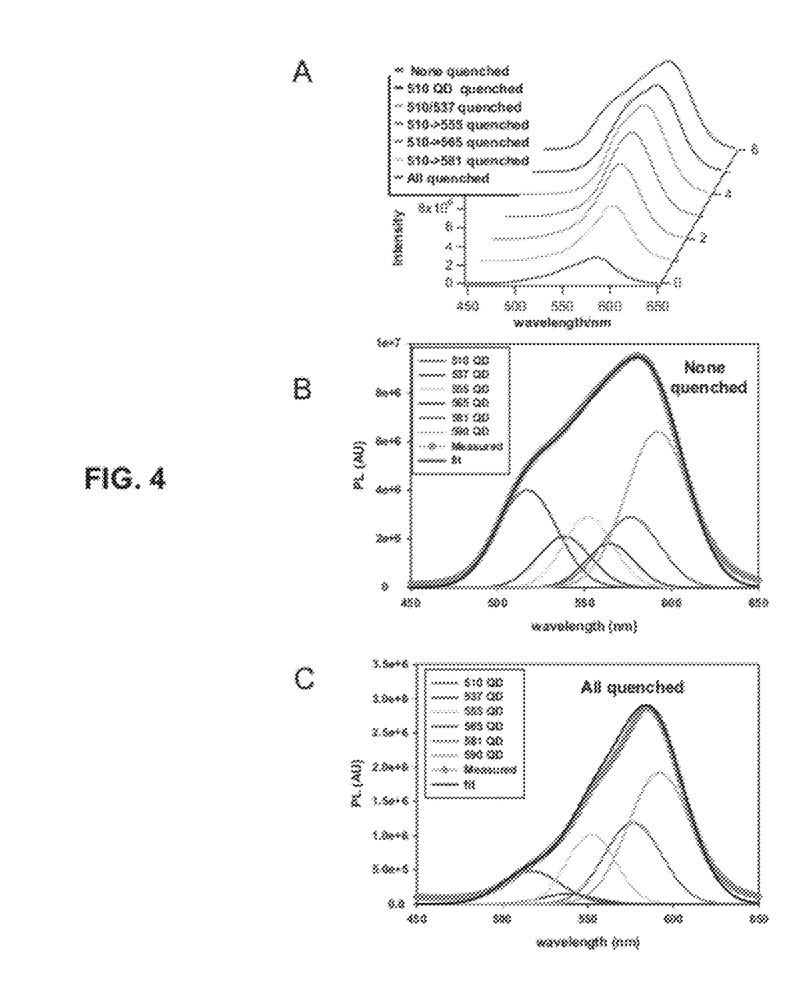
FIG. 4 shows an exemplary six-color multiplexing configuration using 510, 537, 555, 565, 581 nm DHLA-QDs and 590 DHLA-PEG-QDs.
Figure 5:
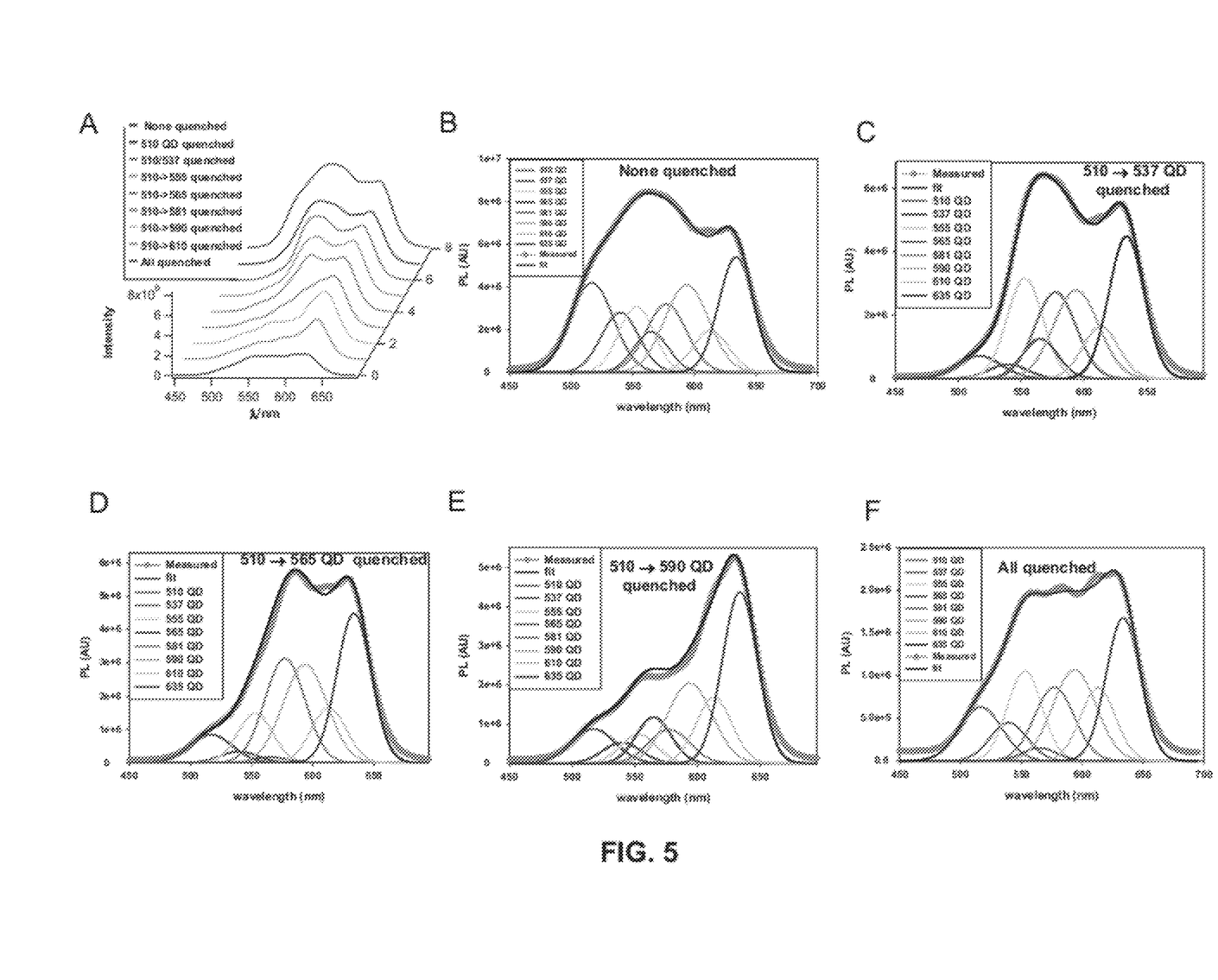
FIG. 5 shows an eight-color multiplexing configuration using 510, 537, 555, 565, 581, 590, 610 and 635 nm QDs. The panels therein have different intensity scales.

In each sample configuration used, the overall structure of the composite spectra reflects the number of QD populations involved along with the PL loss experienced by each individual channel. For example, in the six-color quenching progression shown in FIG. 4, the composite spectra are characterized by an asymmetric curve dominated by the slightly stronger emissions from the 510 nm and 590 nm QDs. The contribution from 590 nm QDs dominates the composite spectrum shown in FIG. 4c where the 510 nm QDs are more effectively quenched. Data shown in FIGS. 3-5 show that quantitative spectral deconvolution of composite spectra which account for the contribution of each QD population in the sample can be achieved using Equation 2. This also indicates that simultaneous and selective interrogation of single or combinations of charge transfer channels using these QD mixtures can be achieved in a straight forward and selective manner.

Error Analysis. Spectral deconvolution in the above examples was aided by the narrow and symmetric photoemission of the QDs. Nonetheless, errors associated with solution-phase quenching (cross-talk) and the possibility that a particular spectral deconvolution may not be a 'unique' solution can affect the subsequent data analysis. These issues become more relevant for higher degrees of complexity (i.e., higher orders of multiplexing) and they could limit the ability to accurately perform spectral deconvolution and extract the quenching efficiency for particular channel(s). "Cross-talk" which arises from collision encounters due to conjugate diffusion is expected to be more pronounced for higher reagent concentrations and/or higher orders of multiplexing. For the latter the overall reagent concentration unavoidably increases even though concentrations of the individual populations may actually be very small. The error associated with the spectral deconvolution is not experimentally induced. It occurs when a solution for the contribution from each QD set in the mixture is not 'unique' and a slight adjustment in the relative amplitudes of 2 or more closely positioned peaks ($C_i A_i$ in Equation 2) can produce the same overall fit for a given composite spectrum.

Figure 6:
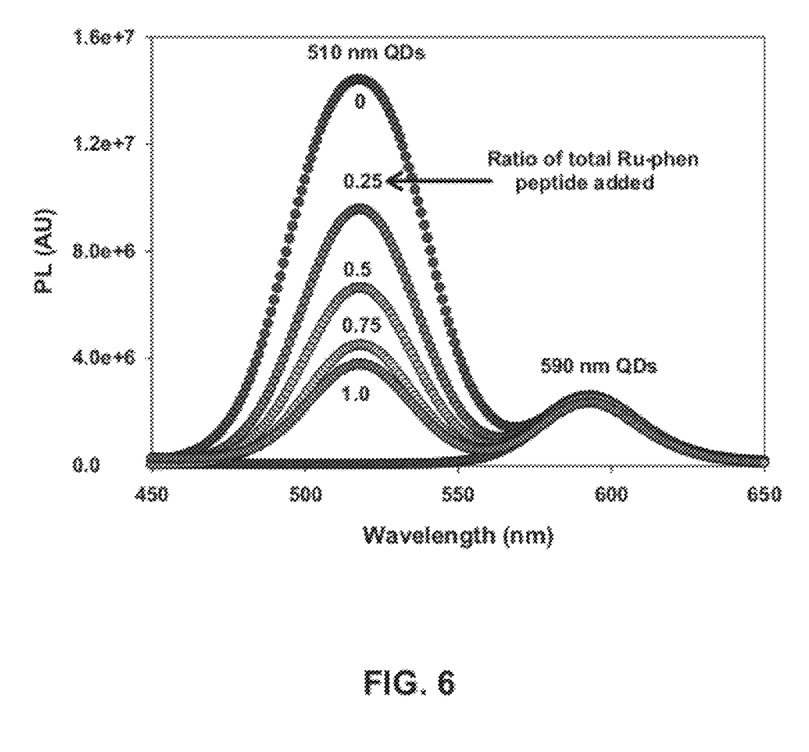

To evaluate the errors associated with solution-phase quenching, the PL of 590 nm QDs was monitored in a mixture with 510 nm QD-Ru-phen-peptide conjugates. The 590 nm QD concentration was identical to the one used in the eight-plex sample described above, while that of the 510 nm QDs was higher and matched the concentration of the other seven QD colors combined. The clear spectral separation allowed direct monitoring of the quenching of both QD emissions without signal deconvolution. The molar concentration of Ru-phen peptide pre-assembled on the 510 nm QDs added to the mixture was incrementally increased until it matched the combined concentration of Ru-phen complex utilized in the above eight-plex (it is equal to the total Ru-phen present for all eight QD colors combined). Data shown in FIG. 6 indicate that while PL loss for the 510 nm QDs reached ~80% (for the highest Ru-phen valence), loss in the 590 nm QD PL was lower than 5%, confirming that the effects of solution-phase collision quenching are overall small. This observation is further complemented by analyzing each deconvoluted QD emission (from the composite spectrum) and comparing it to the emission collected from that same population alone (controls of similarly unquenched or quenched QDs); it was found that the difference in PL intensity was less than 10% in all cases. Cumulatively, these results also confirm that there is no visible peptide loss/exchange for these solution conjugates even in concentrated or dense multiplexed formats.

CONCLUSIONS

The charge transfer interactions between luminescent QDs and proximal metal/redox complexes were employed to induce controlled quenching of the QD emission in a multiplexed format. By taking advantage of the ability of Ru-phen complex to effectively quench the emission of several size CdSe—ZnS QDs emitting over a broad window of the optical spectrum, high orders of multiplexed quenching were achieved. Up to eight channels could be resolved using QD emissions ranging from 510 to 635 nm conjugated to Ru-phen complex via a short peptide bridge. It is expected that it would be possible to resolve more than eight distinct channels. The relative contribution of each QD color could be extracted from the composite spectra of the solution mixtures having various combinations of QDs and QD-Ru-phen conjugates. The described multiplexing scheme provides a key advantage over prior methods, as FRET-based multiplexing is limited by the number of suitable QD-dye donor-acceptor pairs. Additionally, the latter type of FRET configuration can become complex when the dye acceptor used is also emissive.

The present QD-multiplexing modality can be incorporated into a number of different biosensors and allow for multiplex discrimination of analytes in mixed samples. Simultaneously monitoring different proteases, different DNA molecular beacons or alternatively detecting multiple small molecules utilizing biosensors based upon this interaction may prove to be useful and a logical extension in this work. These types of multiplex sensing formats are highly desirable as they do not suffer from the same photophysical liabilities (i.e., overlapping absorptions/emissions, need for multiple excitation wavelengths/spectra windows, high-crosstalk, etc) when attempting multiplexing with conventional organic or fluorescent protein fluorophores. In a multiplexed format, when a target molecule specific to one of the sensors is introduced, changes in the PL signal of that channel will be measured, providing a means to sense that particular target(s) presence.

This quenching scheme also suggests the basis for designing multi-color fluorescent barcodes. This can be achieved, for example, by embedding a combination of the QD-Ru-phen peptides into a porous bead, where the emission profile per bead can be controlled to provide a defined well code. In contrast to current strategies for QD barcoding where individual intensities in the composite are altered by changing a particular QDs concentration, charge-transfer based quenching can allow an orthogonal format where QD concentrations are kept constant and individual emissions are discretely modulated as desired. This may provide an alternate method for generating large sets of predefined spectral codes. For example, in a eight-plex utilized at just 4-different intensities per QD color, 65,535 possible codes are theoretically possible (m QD colors at n intensities yields $n^m - 1$ codes). Overall, it is clear that as more of the unique properties available to QDs are elucidated (as exemplified by the coupling of charge-transfer for high-order signal multiplexing here), new opportunities will be afforded for enhanced biological analysis.

Fluorescence multiplexing using QDs has numerous possible applications. These include: QD-antibody immunoconjugates to simultaneously detect multiple targets (e.g., toxins) in the same sample; multi-color array hybridization; polychromatic flow cytometry immunophenotyping assays; optically-barcoded probes; and optical barcodes that are optionally hidden from plain sight (steganography). Similarly, it is possible to develop QD-emission based cryptograms, where the number of QD emissions, their relative intensities, along with the choice of excitation wavelength could provide a unique approach to data encryption.

Potential applications include sale and use in all (future) areas where complex optical spectra/codes or 'barcodes' are desired in both biological and non-biological applications. This includes but is not limited to: labeling of individual cells and populations of cells or tissues with different combinations/colors of QDs of variable intensity; multicolor biological labels either encapsulated in matrices such as polystyrene (nano)particles or in combinations on their own as probes for biological assays and multiplexing, in vivo imaging and tracking; optical barcoding as a unique means of encoding in combinatorial chemistry schemes and high-throughput biological assays; for unique identification, authentication and forgery prevention of documents, and as a taggant of chemicals, materials and devices. Additionally, the described optical barcodes may also function in cryptography.

Quantum dots can be employed in any number of colors ranging from those in the ultraviolet region to infrared. In an embodiment, the quantum dots are in colors entirely in non-visible portions of the spectrum (i.e., that normally seen by the human eye). Such an embodiment may be useful for hidden barcodes.

In the described optical barcodes, the constituent quantum dots are optionally bonded together. Optical barcodes may be provided in an aqueous or organic solution or on a surface. The optical barcodes may also be provided in a matrix or in the form of a bead.

The described techniques provide several new and advantageous features. They constitute a simple alternative to current methods for creating complex QD spectra. They allow for the creation of without varying the number of component QDs. The intensity of component QDs could be controlled orthogonally through charge transfer and instead of by concentration. Complex optical spectra/barcodes created with QDs in this manner can potentially be utilized in solution, within cellular environments or embedded within matrices such as nanoparticles. The techniques are applicable and compatible with both biological and non-biological environments.

Furthermore, only one excitation source is required to excite these complex optical spectra/barcodes. Due to the high QD multi-photon action cross-sections, multiphoton excitation sources can be used to interrogate these complex optical spectra/codes allowing them to be imbedded in environments/matrices that are opaque to conventional excitation sources. Accordingly, uses exist in applications for forgery protection and authentication.

Beyond the use of peptide-based modulators as described in the Examples, a variety of other redox-labeled biomolecules can be utilized for self-assembly or conjugation to QDs and then modulate QD PL through either electron donating or accepting properties (quenching or enhancement). In certain applications it may be desirable to use DNA or other linking chemistries (such as an alkane linker) to attach modulators. Redox-active moieties can be directly attached to QDs, i.e. covalently or ionically, to effect the same outcome. Use of different redox-labels with variable redox potentials (stronger/weaker quenching/enhancement based on electron donating/withdrawing properties) can modulate or fine-tune component QD emission as desired.

Each and every document cited in this disclosure is incorporated herein by reference in its entirety.

All numbers expressing quantities of ingredients, constituents, reaction conditions, and so forth used in the specification are to be understood as being modified in all instances by the term "about." Notwithstanding that the numerical ranges and parameters set forth, the broad scope of the subject matter presented herein are approximations, the numerical values set forth are indicated as precisely as possible. Any numerical value, however, may inherently contain certain errors resulting, for example, from their respective measurement techniques, as evidenced by standard deviations associated therewith.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed in accordance with 35 U.S.C. §112, ¶6 unless the term "means" is expressly used in association therewith.

The invention claimed is:

1. A method of preparing optical barcodes, comprising:
   combining a plurality of populations of quantum dots with quantities of a modulator of photoluminescence to produce a plurality of optical barcodes,
   wherein the plurality of optical barcodes have at least two distinguishable colors arising from varying quantities of a modulator of photoluminescence bound to the populations of quantum dots,
   wherein the modulator of photoluminescence acts to quench or enhance photoluminescence.

2. The method of claim 1, wherein the resulting optical barcodes have between two and eight distinguishable colors.

3. The method of claim 1, wherein the populations of quantum dots are present in fixed proportions among the plurality of optical barcodes.

4. The method of claim 1, wherein the quantum dots emit colors entirely outside visible portions of the spectrum.

5. A method of preparing optical barcodes, comprising:
   combining a plurality of populations of quantum dots with quantities of a modulator of photoluminescence to produce a plurality of optical barcodes,
   wherein the plurality of optical barcodes have at least two distinguishable colors arising from varying quantities of a modulator of photoluminescence bound to the populations of quantum dots, wherein the modulator of photoluminescence comprises ruthenium phenanthroline.

6. The method of claim 5, wherein said ruthenium phenanthroline is bound to said quantum dots via a peptide.

7. Optical barcodes, comprising:
   a plurality of optical barcodes of having at least two distinguishable colors,
   wherein each optical barcode comprises a plurality of populations of quantum dots, and wherein the distinguishable colors arise from varying, between the barcodes, quantities of a modulator of photoluminescence bound to the populations of quantum dots,
   wherein the modulator of photoluminescence acts to quench or enhance photoluminescence.

8. The optical barcodes of claim 7, wherein the modulator of photoluminescence comprises ruthenium phenanthroline.

9. The optical barcodes of claim 8, wherein said ruthenium phenanthroline is bound to said quantum dots via a peptide.

10. The optical barcodes of claim 7, wherein said optical barcodes have between two and eight distinguishable colors.

11. The optical barcodes of claim 7, wherein the populations of quantum dots are present in fixed proportions among the plurality of optical barcodes.

12. The optical barcodes of claim 7, wherein the quantum dots emit colors entirely outside visible portions of the spectrum.

13. A method of detecting optical barcodes, the method comprising:
   (a) acquiring photoluminescence spectrums from a plurality of optical barcodes having at least two distinguishable colors, wherein each optical barcode comprises a plurality of populations of quantum dots, and wherein the distinguishable colors arise from varying, between the barcodes, quantities of a modulator of photoluminescence bound to the populations of quantum dots; and
   (b) deconvoluting the spectrum to isolate emissions arising from at least two populations of quantum dots from the mixture,
   wherein the modulator of photoluminescence acts to quench or enhance photoluminescence.

14. The method of claim 13, wherein the modulator of photoluminescence comprises ruthenium phenanthroline.

15. The method of claim 14, wherein said ruthenium phenanthroline is bound to said quantum dots via a peptide.

16. The method of claim 13, wherein the at least two populations of quantum dots comprises no more than eight populations of quantum dots.

17. The method of claim 13, further comprising preparing said plurality of optical barcodes by combining said populations of quantum dots with said modulator of photoluminescence.

18. The method of claim 13, wherein the quantum dots emit colors entirely outside visible portions of the spectrum.

* * * * *